United States Patent
Scholz et al.

(10) Patent No.: US 8,416,538 B2
(45) Date of Patent: Apr. 9, 2013

(54) SHAPED SHIELD FOR A MAGNETORESISTIVE HEAD

(75) Inventors: Werner Scholz, Edina, MN (US);
Michael C. Kautzky, Eagan, MN (US);
Meng Zhu, Bloomington, MN (US);
Venkateswara R. Inturi, Shakopee, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 13/194,804

(22) Filed: Jul. 29, 2011

(65) Prior Publication Data
US 2013/0027813 A1   Jan. 31, 2013

(51) Int. Cl.
*G11B 5/33* (2006.01)
(52) U.S. Cl. .................................... 360/319
(58) Field of Classification Search ............... 360/319
See application file for complete search history.

(56) References Cited

U.S. PATENT DOCUMENTS

| | | | |
|---|---|---|---|
| 7,113,365 B1 | 9/2006 | Ryan et al. | |
| 7,391,590 B2* | 6/2008 | Matono et al. | 360/125.32 |
| 7,436,613 B2* | 10/2008 | Takahashi et al. | 360/59 |
| 7,459,769 B2 | 12/2008 | Kato et al. | |
| 7,518,825 B2* | 4/2009 | Nishida et al. | 360/125.2 |
| 2003/0116803 A1 | 6/2003 | Park | |
| 2009/0251827 A9* | 10/2009 | Pokhil et al. | 360/317 |

OTHER PUBLICATIONS

W.Scholz, K. Yu. Guslienko, V. Novosad, D. Suess, T. Schrefl, R. W. Chantrell & J. Fidler, "Transition from single-domain to vortex state in soft magnetic cylindrical nanodots," Journal of Magnetism and Magnetic Materials, 2003, pp. 155-163, Elsevier B.V.

* cited by examiner

*Primary Examiner* — Mark Blouin
(74) *Attorney, Agent, or Firm* — Hall Estill Attorneys at Law

(57) ABSTRACT

A magnetic shield that is capable of enhancing magnetic reading, such as in use as a data transducing head. A magnetic stack can have a read element with an air bearing surface (ABS). The read element may be positioned adjacent a shield layer with a continuously curvilinear sidewall and a shield feature may be positioned within the areal extent of the continuously curvilinear sidewall.

20 Claims, 5 Drawing Sheets

VIEW FROM ABS

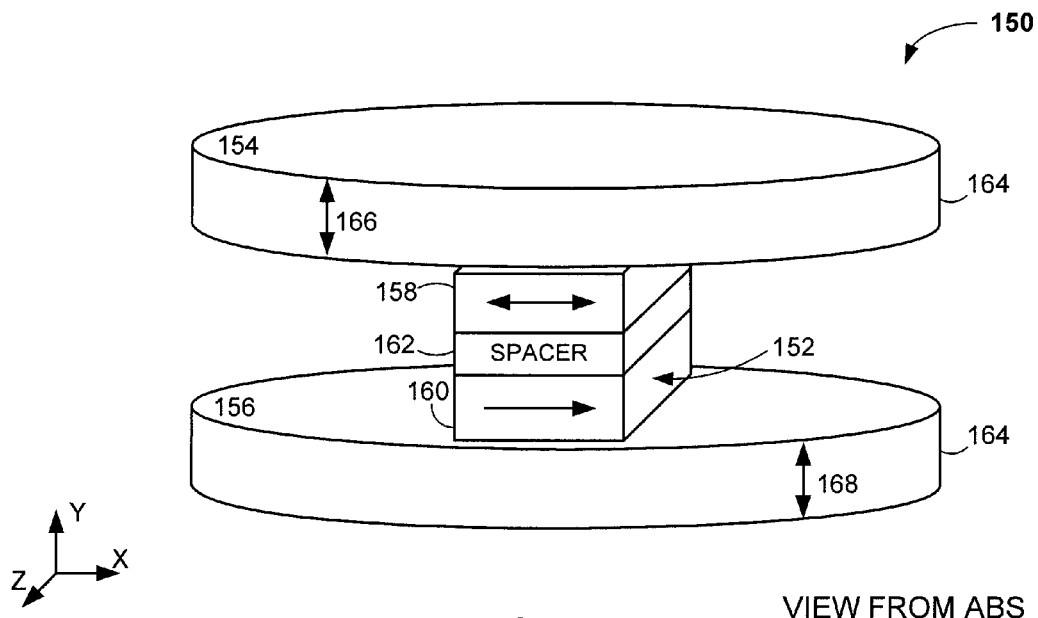
FIG. 3 — VIEW FROM ABS
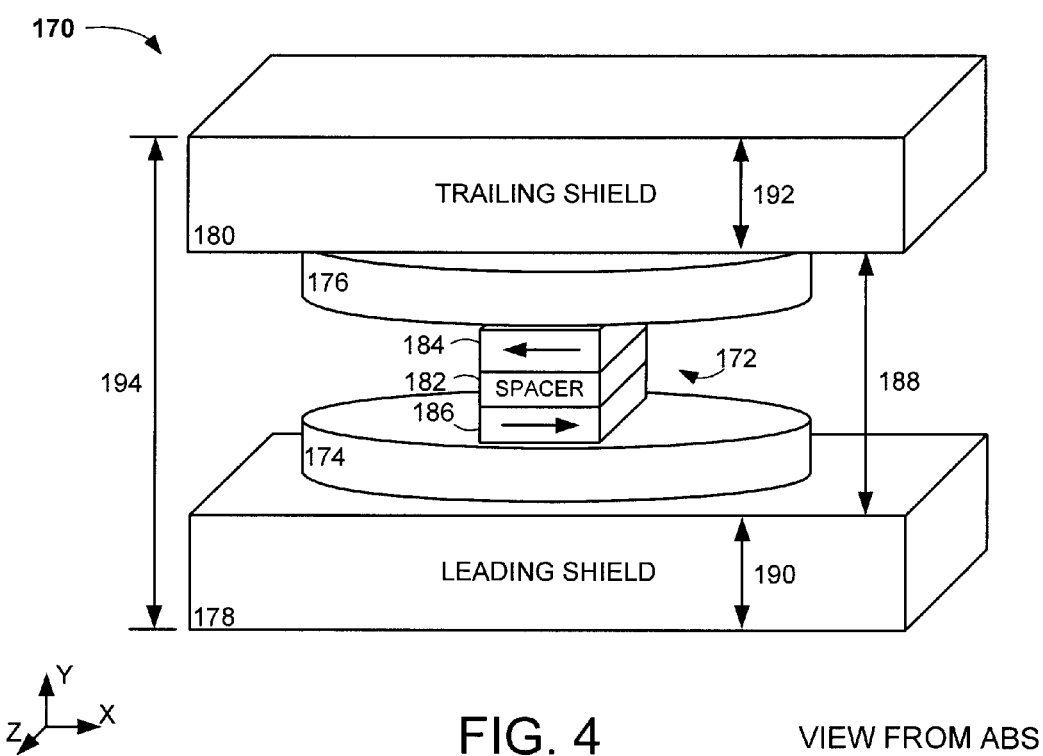
FIG. 4 — VIEW FROM ABS

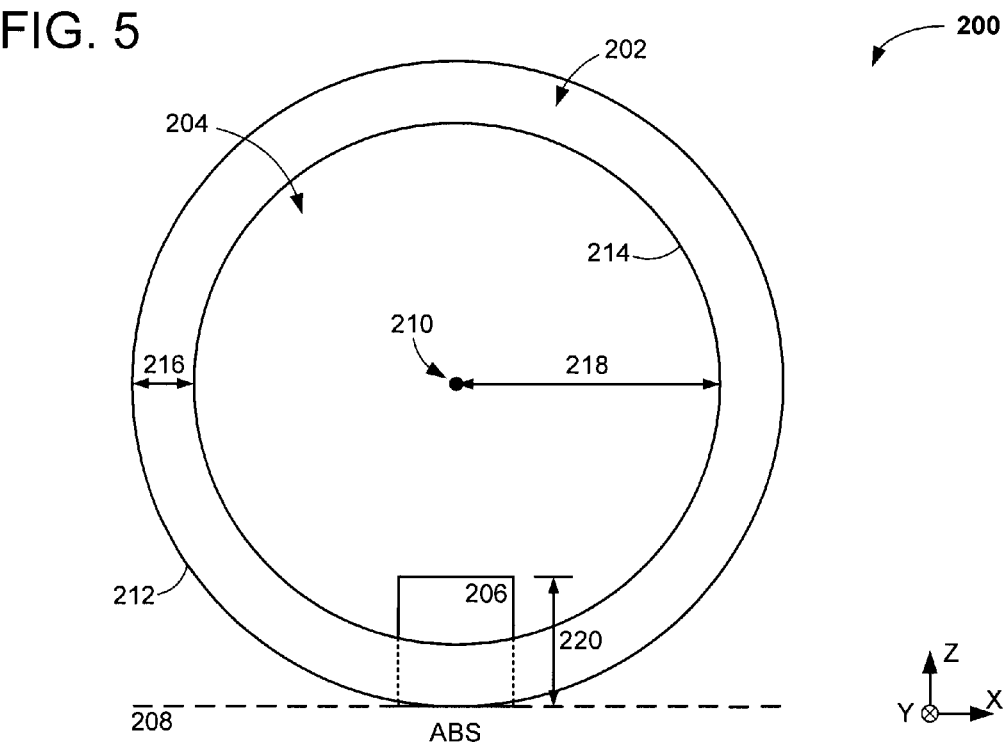
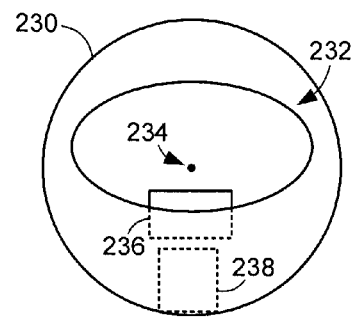
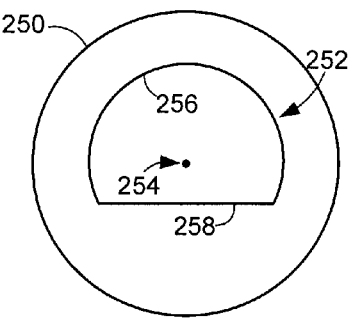
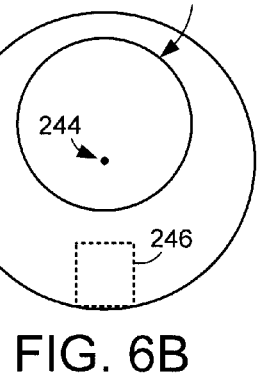

SHAPED SHIELD FOR A MAGNETORESISTIVE HEAD

SUMMARY

Various embodiments of the present invention are generally directed to a magnetic stack that can have a read element with an air bearing surface (ABS). The read element may be positioned adjacent a shield layer with a continuously curvilinear sidewall and a shield feature may be positioned within the areal extent of the continuously curvilinear sidewall.

BRIEF DESCRIPTION OF THE DRAWINGS

FIG. 3 shows a block representation of a portion of an example magnetic element capable of being used in the magnetic element of FIG. 2.

FIG. 4 displays a block representation of a portion of an example magnetic element as viewed from an air bearing surface.

FIG. 5 is a top view of a portion of an example magnetic element.

FIGS. 6A-6B display top views of various embodiments of a shield portion of a magnetic element.

DETAILED DESCRIPTION

The present disclosure generally relates to magnetic reader shields capable of enhancing performance of a magnetoresistive (MR) element, particularly in a rotatable data media. Industry demand for higher performance data storage devices including faster data transfer rates and higher data bit densities has consequently reduced the size of various magnetic components, such as data bits and recording heads. A reduction in data bit size may increase the influence magnetic shields have on the accuracy and speed of data transfers. The presence of magnetic instabilities in a magnetic reader shield can degrade magnetic element performance as domain walls and multiple magnetic polarities affect the detection of data bits. As such, there is an increasing demand for magnetic shields with enhanced stability in data storage devices.

Accordingly, various embodiments of the present invention are generally directed to a magnetic stack that has at least a read element with an air bearing surface (ABS). The read element may be positioned adjacent a shield layer with a continuously curvilinear sidewall. A shield feature may be formed within the areal extent of the continuously curvilinear sidewall, which can provide increased data transfer rates and data reading accuracy due to more stable magnetization, especially in reduced form factor data storage devices. Moreover, by reducing the size of the shield layer, stable domain-wall free magnetic states can be formed within a large magnetic field range, which can reduce noise introduced during reader operation. As such, construction of the shield layer and feature may allow for tuning of the shield layer to enhance magnetic performance in a variety of operational environments.

Figure 1:
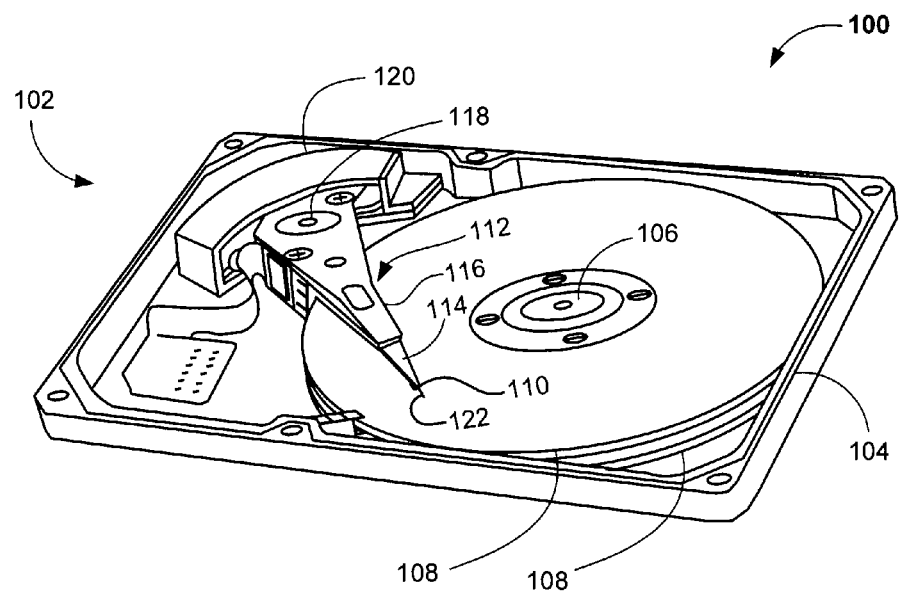
FIG. 1 generally provides of an example data storage device.

FIG. 1 provides an example data storage device 100 that is capable of utilizing a magnetic element. The device 100 is provided to show one of an unlimited number of environments in which various embodiments of the present invention can be practiced. It will be understood, however, that the claimed invention is not restricted or limited to a particular environment, structure, or use.

The device 100 includes a substantially sealed housing 102 formed from a base deck 104 and top cover (not shown). An internally disposed spindle motor 106 is configured to rotate a number of storage media 108. The media 108 are accessed by a corresponding array of data transducers that are each supported by a head gimbal assembly (HGA) 110. Each HGA 110 can be supported by a head-stack assembly 112 ("actuator") that includes a flexible suspension 114, which in turn is supported by a rigid actuator arm 116. The actuator 112 preferably pivots about a cartridge bearing assembly 118 through application of current to a voice coil motor (VCM) 120.

In this way, controlled operation of the VCM 120 can correspond to the transducers 122 of the HGA 110 aligning with tracks (not shown) defined on the media surfaces to store data thereto or retrieve data therefrom. An ability to decrease the width of the tracks while maintaining proper alignment of the transducers 122 can be accomplished by decreasing the operational width of at least one transducing magnetic element. Thus, the device 100 can have increased capacity through the incorporation of transducing elements with reduced operational width which corresponds to a finer areal resolution.

Figure 2:
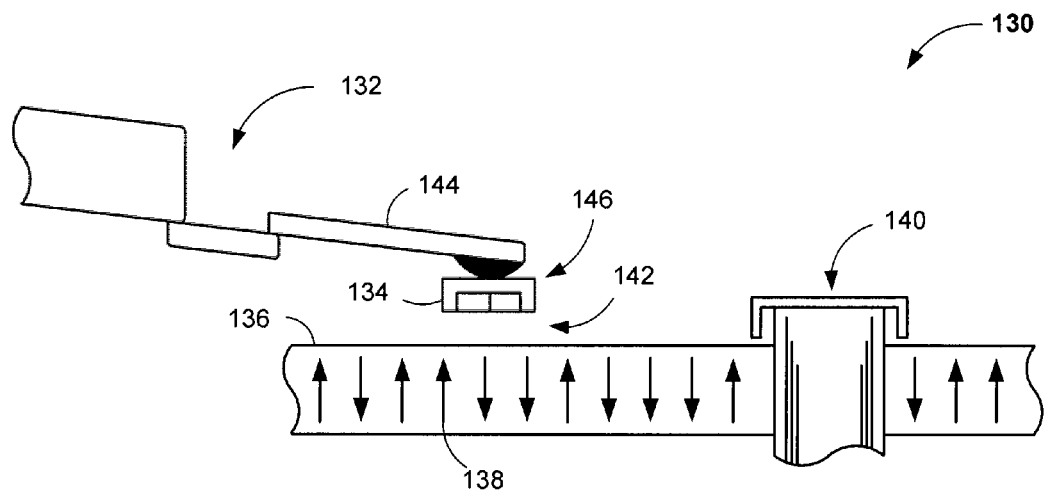
FIG. 2 illustrates a portion an example magnetic element capable of being used in the data storage device of FIG. 1.

An example data transducing portion 130 capable of being used with the data storage device 100 of FIG. 1 is displayed in FIG. 2. The transducing portion 130 has an actuating assembly 132 that positions a transducing head 134 over a magnetic storage media 136 that is capable of storing programmed bits 138. The storage media 136 is attached to a spindle motor 140 that rotates during use to produce an air bearing surface (ABS) 142 on which a slider portion 144 of the actuating assembly 132 flies to position a head gimbal assembly (HGA) 146, which includes the transducing head 134, over a desired portion of the media 136.

The transducing head 134 can include one or more transducing elements, such as a magnetic writer and magnetically responsive reader, which operate to program and read data from the storage media 136, respectively. As a result, controlled motion of the actuating assembly 132 causes the transducers to align with tracks (not shown) defined on the storage media surfaces to write, read, and rewrite data. However, the reduction in track widths that corresponds with ever decreasing data bit sizes can induce reading inaccuracies when the magnetic flux from an adjacent track is sensed inadvertently. In view of the susceptibility to proximal data bits 138, a magnetic element has one or more shields that function to absorb unwanted magnetic flux so that only desired data bits 138 on a predetermined data track are written and read.

FIG. 3 generally illustrates an example magnetic stack 150 that can be used in isolation or in conjunction with the data transducing portion 130 of FIG. 2. The magnetic stack 150 has a magnetically sensitive data read element 152 disposed between top and bottom shield layers 154 and 156. The data read element 152 can be constructed in an unlimited number of configurations in which a plurality of magnetic layers are capable of detecting magnetic data bits from an adjacent data storage medium across an ABS. The read element 152 configuration shown in FIG. 3 has a fixed magnetization layer 158 separated from a free magnetization layer 160 by a non-magnetic spacer layer 162.

The placement of the read element 152 immediately adjacent, along the Y axis, at least one shield layer 154 and 156 can enhance data reading performance by controlling the influence of magnetic flux on the read element 152 from both inside and outside the magnetic stack 150. The performance of the read element 152 can also be enhanced as the layers 158, 160, and 162 of the read element 152 are elongated along the Z axis, which can be characterized as an extended stripe height. However, accurate interaction between the read element 152 and shields 154 and 156 can be difficult as the shape and size of each read shield becomes conducive to the establishment of domain walls due at least in part to magnetostatic self-demagnetization.

By shaping each shield layer 154 and 156 with a continuously curvilinear sidewall 164, each shield is tuned and optimized by its shape and size to ensure enhanced operating conditions, which corresponds with a reduced number of domain walls that are less likely to form as a single magnetic "vortex state" is reached, which may improve magnetic stability and data reading accuracy in high data bit density storage devices. The curvilinear sidewall 164 allows each shield layer 154 and 156 to provide better magnetization due to the magnetic vortex state being present in the minimum energy state of the shield layer 154 and 156.

In some embodiments, each shield layer 154 and 156 has predetermined thicknesses 166 and 168 that may be different or the same. The size of each shield layer 154 and 156 can also be the same or vary as each layer may or may not be constructed to completely surround the read element 152 with the curvilinear sidewall 164. The position of each shield layer 154 and 156 is likewise unlimited and can be or be 152 by a predetermined distance while being oriented to contact the ABS.

In yet another embodiment, one or both shield layers 154 and 156 are positioned predetermined shielding distances from the read element 152 at the ABS, but oriented with enlarged shielding distances distal to the ABS, along the Z axis, so that the shields are tilted with respect to the ABS. The increased performance and ability to configure each shield layer 154 and 156 with enhanced magnetic control allows for accurate shielding proximal to the read element 152, but may have additional operational considerations, such as thermomechanical characteristics, that illustrate the presence of shield layers 154 and 156 are inadequate for some environments.

FIG. 4 shows an isometric view from the ABS of another magnetic stack 170 that disposes a read element 172 between the combination of continuously curvilinear shield layers 174 and 176 and rectangular leading 178 and trailing 180 shields. Instead of the fixed and free magnetic layers of the read element 152 in FIG. 3, the read element 172 is constructed with a non-magnetic spacer layer 182 disposed between first and second magnetically free layers 184 and 186, which can be characterized as a trilayer element that may be biased to a default magnetization by a separate magnet.

As with the shield layers 154 and 156 of FIG. 3, the shield layers 174 and 176 can be configured and oriented in a variety of different manners, with no particular manner being restricted or limited. In the embodiment shown in FIG. 4, the leading 178 and trailing shield 180 are located on the ABS a predetermined element length 188 apart. The ability to adjust the element length 188 and the respective thicknesses 190 and 192 of the leading 178 and trailing 180 shields can provide a physical magnetic stack profile that may accommodate large and small form factor environments. Such physical magnetic stack profile adjustment can further include modification of the magnetic stack thickness 194 along the Y axis distal to the ABS to reduce selected portions of the magnetic stack profile.

The leading 178 and trailing 180 shields may, in various embodiments, be formed so that both the read element 172 and shield layers 174 and 176 are within their areal extent. That is, the outer dimensions of the leading 178 and trailing 180 shields extend to or beyond the outer dimensions of the read element 172 and shield layers 174 and 176, which place the components within the bounds of the leading 178 and trailing 180 shields. As shown, the configuration of the magnetic stack 170 can align each shield and the read element with the ABS, along the X axis, while keeping the read element 172 and shield layers 174 and 176 within the areal extent of the leading 178 and trailing 180 shields.

The combination of the leading 178 and trailing 180 shields and shield layers 174 and 176, each of which can be collectively or independently sized and shaped, allows for redundant magnetic shielding that can enhance read element 172 performance through macro and micro magnetic flux defense. That is, the rectilinear leading 178 and trailing 180 shields of the magnetic stack 170 can be tuned with various material compositions such as, but limited to, NiFe and NiCoFe, to provide strong magnetic shielding distal to the read element 172 while the shield layers 174 and 176 provide more precise, but weaker, magnetic shielding proximal to the read element 172.

The operational tuning of the various shields can be optimized with the addition of a shield feature positioned within at least one shield layer 174 and 176. FIG. 5 generally displays a top view of an example magnetic stack 200 that has a shield layer 202 with a shield feature 204. The shield layer 202 is positioned atop a read element 206 on the ABS 208 with the shield feature 204 disposed about the center 210 of the shield layer 202. It should be noted that the center 210 can be the middle of the shield layer 202 that is equidistant to all points along the continuously curvilinear sidewall 212. However, the center 210 can also be characterized as the focus in the event the curvilinear sidewall 212 forms an ellipse.

While the shield layer 202 and shield feature 204 are not limited to a particular shape and size, the shield feature 204 can have a continuously curvilinear sidewall 214 that extends partially or wholly through the thickness of the shield layer 202. Thus, the shield feature 204 can be configured to produce a doughnut shaped shield layer 202 that has a uniform width 216 along the Z-X plane. Such shield layer 202 configuration can be sized so that the radius 218 and width 216 of the shield feature 204 are each greater or smaller than the stripe height 220 of the read element 206, which may result in the read element 206 partially extending into the areal extent of the shield feature 204.

The size of the read element 206 and position with respect to the shield feature 204 can be modified and tuned to create a variety of operational characteristics that exhibit optimized performance. For example, as the stripe height 220 of the read element 206 increases past a predetermined threshold, such as the width 216, the size, shape, and position of the shield feature 204 can be tuned so that the read element 206 rests within a predetermined portion of the areal extent of the shield feature 204. That is, the areal extent of both the shield layer 202 and feature 204 can be characterized as anything underlying the shield layer 202 and feature 204 along the Y axis, as displayed by the top view of FIG. 5.

FIGS. 6A-6C display various example shield features that can be used to tune and optimize the magnetic shielding and read element operation in a magnetic stack. FIG. 6A shows a shield layer 230 with an oval shaped shield feature 232 formed about the center 234 of the shield layer 230. While the shield feature 204 of FIG. 5 had symmetry along both Z and X axis passing through the center 210, the shield feature 232, as shown, merely has symmetry along the Z axis.

The presence of asymmetry along the X axis can allow the shield layer 230 to go into a single magnetization vortex state in remanence without magnetic initialization. Such asymmetry can be used, in some embodiments, in conjunction with a permanent magnet 236 mounted behind the read element 238 that biases the magnetization of the element layers to a bias polarization. The permanent magnet may be present when a trilayer read element 238 lacks a fixed magnetization and by positioning such a permanent biasing magnet 236 with a selected portion in the areal extent of the asymmetric shield feature 232, magnetic stability of the shield layer 230 and read element 238 can be more precisely controlled.

FIG. 6B shows shield layer 240 with a circular shaped shield feature 242 formed about a center 244 of the shield layer 240 and oriented away from a read element 246. The positioning of the circular shield feature 242 so that none of the read element 246 is within the areal extent of the feature 242 can reduce magnetic flux leakage, especially when a permanent magnet is present, as displayed in FIG. 6A. However, symmetric shield features, such as features 242 and 204, may not spontaneously go into a single magnetization vortex state until after an initialization procedure.

In FIG. 6C, a continuously curvilinear shield layer 250 has an asymmetric shield feature 252 formed about a center 254 of the shield layer 250. The shield feature 252 has a curvilinear portion 256 connected by a linear portion 258. Such a shield feature 252 configuration can provide the ability to place the read element 260 only within the areal extent of the shield layer 250 while having an asymmetric and spontaneous vortex state shield feature 252.

The various shield feature configurations displayed in FIGS. 6A-6C are merely examples of an unlimited number of shapes and orientations that can be used in a shield layer to tune and optimize magnetic shielding and read element operation. Another example shield feature configuration has a shaped recess formed about the center of the shield layer without extending completely through the thickness of the shield layer. Yet another example shield feature configuration provides a solid aperture-less shield layer with a greater thickness about the center of the shield layer.

Figure 7A:
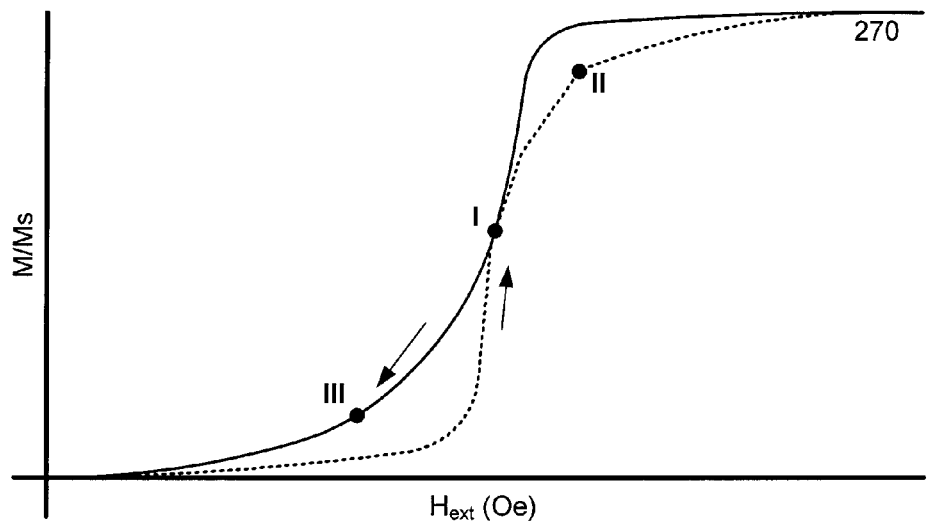
FIGS. 7A-7D graph and generally illustrate operational characteristics of a magnetic element as operated in accordance with various embodiments.

Regardless of the configuration of the shield feature, the continuously curvilinear shield layer can provide enhanced read element operation through improved magnetic stability. FIGS. 7A-7D generally show example operating scenarios in which at least one shield layer immediately adjacent a read element enhances performance. FIG. 7A graphs an example hysteresis loop 270 that illustrates how a vortex state is produced with respect to magnetic moment and magnetic saturation of a shield layer.

Figure 7D:
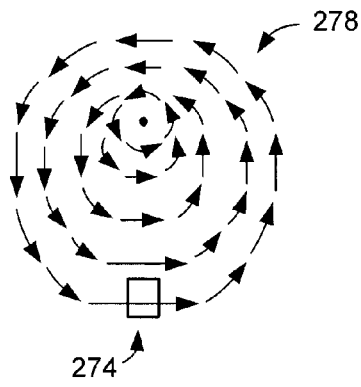
Figure 7B:
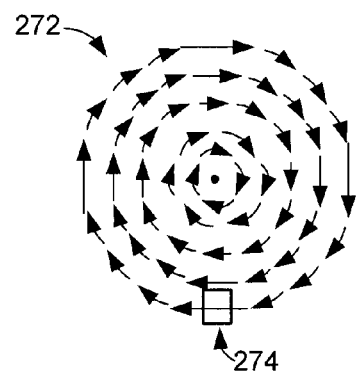

While a shield layer is at a minimal magnetization saturation, point I is encountered, which corresponds with the top view of the magnetic magnetization 272 surrounding a read element 274 shown in FIG. 7B. The magnetization 272 illustrate how a magnetic vortex is formed in the shield layer as magnetic moments follow the circumference of the shield layer so that magnetostatic energy is minimized and the cost of exchange energy at the central point is mitigated by forming a vortex core with out-of-plane magnetization.

Figure 7C:
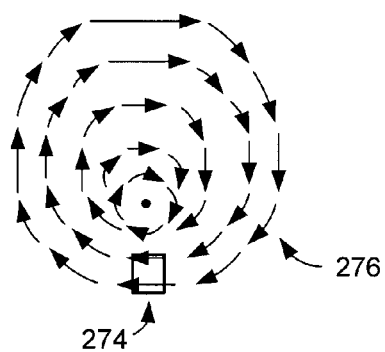

With a further increase in magnetic field influencing the shield layer, point II is reached, which corresponds to the magnetization 276 of FIG. 7C. Point II has enough magnetization to fully form a stable vortex state that remains in a narrow magnetic field range with the vortex core moving perpendicular to the external shielded field. As displayed in FIG. 7C, the single stable vortex state provides a substantially homogeneous magnetization direction throughout the read element 274, which may correspond to enhanced operational stabilization and more accurate data sensing.

When the magnetization 278 of the shield layer is large enough, such as point III which corresponds to FIG. 7D, the vortex core is pushed to the edge of the shield while providing a substantially uniform magnetization direction through the read element 274. As the magnetic saturation reaches capacity, the vortex state shown in FIGS. 7B-7D becomes annihilated due to instability.

In FIGS. 7B-7D, the translation of the vortex core of the magnetization 278 towards the edge of the shield layer is displayed with increasing external magnetic field while maintaining a relatively uniform magnetization across the read element 274. The figures further visually support the ability to tune the performance of the read element by modifying the size and shape of the shield layer. That is, the movement of the vortex core as the shield layer is influenced by greater magnetic fields can maintain substantially uniform magnetization through the read element by configuring the read element completely within the areal extent of the shield layer.

The example operational scenarios displayed in FIGS. 7B-7D can be extended and enhanced with the inclusion of a shield feature, such as the features of FIGS. 5-6C. A shield feature can provide the ability to precisely control magnetic stability in the shield layer and subsequently more securely maintain a substantially uniform magnetization direction across the read element regardless of the amount of external magnetic field acting on the shield layer.

Figure 8:
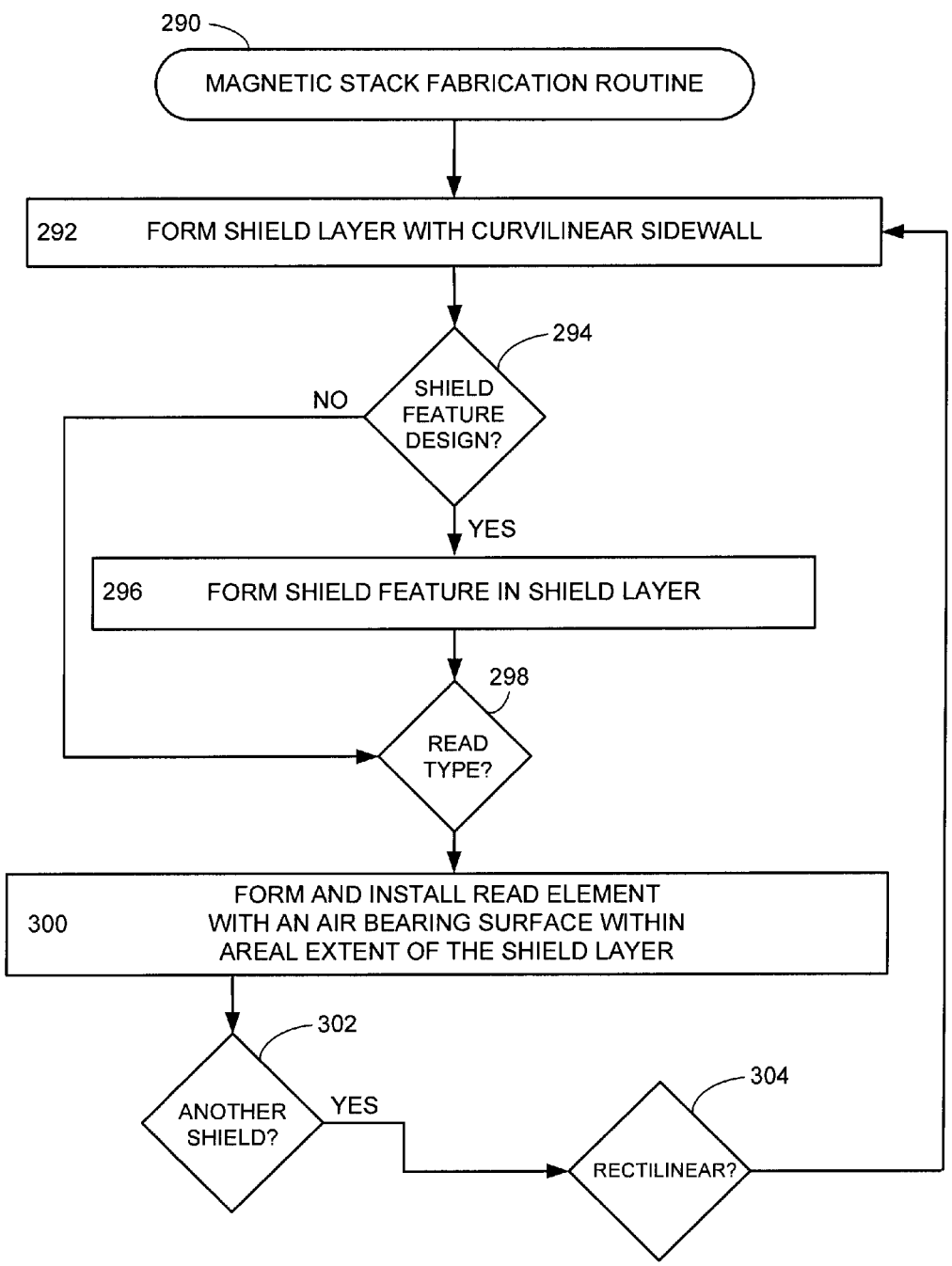
FIG. 8 provides a flowchart of an example magnetic stack fabrication routine conducted in accordance with various embodiments.

FIG. 8 is an exemplary magnetic stack fabrication routine 290 that can produce a magnetic element with optimized read element performance in accordance with various embodiments of the present invention. Initially, the routine 290 forms a shield layer with a continuously curvilinear sidewall in step 292. The shield layer may have a variety of different shapes, such as circular and oval, that has an areal extent within the exterior bounds of the shield layer. Next, decision 294 contemplates the design of a shield feature to be formed about the center of the newly created shield layer. A chosen design, which may be similar to the shield features of FIGS. 5-6C, is then implemented into to the shield layer in step 296.

After the shield feature is formed or if a shield feature is constructed in step 296, decision 298 then determines the type of read element to be used in the magnetic stack. As discussed above, a lamination of magnetic and non-magnetic layers can be configured to include a fixed magnetic reference layer or a separate biasing magnet. Once the type of element is decided, step 300 forms the read element with a predetermined air bearing surface that will face an adjacent data storage media. In the event a trilayer read element is chosen, step 300 can form, concurrently or individually, a permanent magnet that is separated from the read element.

Step 300 further installs the previously formed read element within the areal extent of the shield layer. Depending on the type and size of the read element, the read element can be installed with some or the entire element within the areal extent of the shield feature. Such installation may also have a permanent magnet partially or wholly within the areal extent of the shield feature. The installation of the read element in immediate adjacency with the shield layer prompts the routine 290 to proceed to decision 302 where another shield layer is evaluated.

A decision that the existing number of shield layers is sufficient terminates the routine 290. However, if decision 302 requests another shield layer, decision 304 subsequently determines if the additional shield layer is to be curvilinear or rectilinear, like leading 178 and trailing 180 shields of FIG. 4. Regardless of the shape of the additional shield layer, decision 304 proceeds to loop back to step 292 where the next shield layer is formed atop the read element on the air bearing surface, opposite the previously installed shield layer.

With the various decisions and possible configurations of the magnetic stack, in routine 290, it can be appreciated that none of the steps and decisions are required or limited. As such, the routine 290 can be adjusted and tuned to accommodate various operational characteristics common in reduced form factor data storage devices. For example, the decision 304 may be conducted before decision 298 upon initial execution of the routine 290. As such, the routine 290 is not required or limited as the various decisions and steps can be omitted, changed, and added as desired to construct a magnetic element with enhanced shielding, magnetic stability, and data bit reading.

It can be appreciated that the configuration and material characteristics of the shield layers and magnetic stack in the present disclosure allows for advantageous magnetic data bit reading through the reduction of magnetic instability. The utilization of a continuously curvilinear shield layer may provide increased manufacturing efficiency while allowing for redundant magnetic shielding with the inclusion of additional magnetic shields. Moreover, the formation of a shield feature in each shield layer allows for precise magnetization control that can be adjusted during construction to provide predetermined performance characteristics optimized for the type and size of the read element.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A magnetic stack comprising a read element with an air bearing surface (ABS), the read element adjacent a shield layer with a continuously curvilinear sidewall and a shield feature within the areal extent of the continuously curvilinear sidewall, the shield feature comprising an internal sidewall extending wholly through the shield layer.

2. The magnetic stack of claim 1, wherein the shield layer contacts has the read element at the ABS and has a uniform thickness along the ABS.

3. The magnetic stack of claim 2, wherein the shield feature extends through the uniform thickness of the shield layer.

4. The magnetic stack of claim 1, wherein the shield feature is symmetric about a shield axis orthogonal to the ABS.

5. The magnetic stack of claim 1, wherein the shield feature is asymmetric about a shield axis orthogonal to the ABS.

6. The magnetic stack of claim 1, wherein a distance between the continuously curvilinear and internal sidewalls is uniform along the perimeter of the shield layer.

7. The magnetic stack of claim 1, wherein the internal sidewall has a linear portion and a curvilinear portion.

8. The magnetic stack of claim 1, wherein the internal sidewall is shaped as a circle.

9. The magnetic stack of claim 1, wherein the internal sidewall is shaped as an oval.

10. The magnetic stack of claim 1, wherein the shield feature is a continuously solid thickness.

11. The magnetic stack of claim 1, wherein a plurality of shield layers are positioned on opposite sides of the read element on the ABS.

12. The magnetic stack of claim 1, wherein the read element has a plurality of magnetic free layers biased to a predetermined magnetic polarity.

13. The magnetic stack of claim 12, wherein the free layers are biased by a permanent magnet positioned adjacent the read element opposite the ABS, the permanent magnet lying within an areal extent of the shield layer.

14. An apparatus comprising:
a read element with an air bearing surface (ABS), the read element adjacent a shield layer with a first continuously curvilinear sidewall and a shield feature within the areal extent of the first continuously curvilinear sidewall, the shield feature comprising an internal sidewall extending wholly through the shield layer; and
a biasing magnet positioned adjacent to and separated from the read element within the areal extent of the shield layer, the biasing magnet partially extending beyond the internal sidewall.

15. The apparatus of claim 14, wherein the internal sidewall is shaped as a circle.

16. The apparatus of claim 14, wherein a distance between the continuously curvilinear sidewall and the internal sidewall varies along the perimeter of the shield layer.

17. The apparatus of claim 14, wherein the shield feature is positioned with no portion of the read element extends beyond the internal sidewall.

18. A data reader comprising a read element with an air bearing surface (ABS), the read element disposed between first and second shield layers each configured with continuously curvilinear sidewalls, at least one shield layer comprising an internal sidewall extending wholly through the at least one shield layer.

19. The data reader of claim 18, wherein the first shield layer has no internal sidewall while the second shield layer has a continuously curvilinear internal sidewall.

20. The data reader of claim 18, wherein both first and second shield layers comprise a continuously curvilinear internal sidewall.

* * * * *